US011383679B2

(12) United States Patent
Svensson

(10) Patent No.: US 11,383,679 B2
(45) Date of Patent: Jul. 12, 2022

(54) METHOD FOR MAINTENANCE OF A VEHICLE

(71) Applicant: Volvo Truck Corporation, Gothenburg (SE)

(72) Inventor: Magnus Svensson, Gothenburg (SE)

(73) Assignee: Volvo Truck Corporation, Gothenburg (SE)

(*) Notice: Subject to any disclaimer, the term of this patent is extended or adjusted under 35 U.S.C. 154(b) by 122 days.

(21) Appl. No.: 16/768,188

(22) PCT Filed: Dec. 1, 2017

(86) PCT No.: PCT/EP2017/081238
§ 371 (c)(1),
(2) Date: May 29, 2020

(87) PCT Pub. No.: WO2019/105573
PCT Pub. Date: Jun. 6, 2019

(65) Prior Publication Data
US 2020/0290574 A1 Sep. 17, 2020

(51) Int. Cl.
*B60S 5/00* (2006.01)
*B60W 50/00* (2006.01)
(Continued)

(52) U.S. Cl.
CPC ............. *B60S 5/00* (2013.01); *B60W 50/00* (2013.01); *G01B 11/2755* (2013.01);
(Continued)

(58) Field of Classification Search
CPC ... G01S 13/88; G01B 11/275; G01B 11/2755; G01B 2210/143; G01B 2210/16;
(Continued)

(56) References Cited

U.S. PATENT DOCUMENTS

| 5,612,606 A | 3/1997 | Guimarin et al. |
| 5,760,938 A | 6/1998 | Hodge |

(Continued)

FOREIGN PATENT DOCUMENTS

| CN | 102025772 A | 4/2011 |
| CN | 103080694 A | 5/2013 |

(Continued)

OTHER PUBLICATIONS

First Office Action for Chinese Patent Application No. 201780097359.7, dated Apr. 16, 2021, 15 pages.
(Continued)

*Primary Examiner* — Atul Trivedi
(74) *Attorney, Agent, or Firm* — Withrow & Terranova, PLLC

(57) ABSTRACT

The invention relates to a method for maintenance of a vehicle, comprising—determining (S2, S8) the position, in a fixed coordinate system, of at least one first part (2011, 4, 3011) of a vehicle, —characterized by determining (S3) the identity of the vehicle, —retrieving (S4, S10), by means of the vehicle identity, spatial data indicating how a second part (202, 2011, 4) of the vehicle is spatially related to the first part (201), and—determining (S8, S11) the position, in the fixed coordinate system, of the second part (202, 2011, 4) based at least partly on the first part position and the spatial data.

27 Claims, 5 Drawing Sheets

(51) Int. Cl.
*G01B 11/275* (2006.01)
*G01S 13/88* (2006.01)

(52) U.S. Cl.
CPC ...... *G01S 13/88* (2013.01); *B60W 2050/0083* (2013.01); *B60W 2300/10* (2013.01); *B60W 2300/125* (2013.01); *G01B 2210/143* (2013.01); *G01B 2210/16* (2013.01)

(58) Field of Classification Search
CPC ....... B60W 2300/10; B60W 2300/125; B60W 50/00; B60W 2050/0083; B60S 5/00
USPC ........................................................ 701/29.6
See application file for complete search history.

(56) References Cited

U.S. PATENT DOCUMENTS

| | | | |
|---|---|---|---|
| 5,812,256 A * | 9/1998 | Chapin | G01B 11/275 356/139.09 |
| 11,045,271 B1 * | 6/2021 | Tran | A61B 34/32 |
| 2007/0213852 A1 * | 9/2007 | Malm | G05B 19/41805 700/56 |
| 2010/0076631 A1 * | 3/2010 | Mian | B25J 5/007 701/19 |
| 2011/0001821 A1 | 1/2011 | Stieff et al. | |
| 2011/0071720 A1 | 3/2011 | Schondorf et al. | |
| 2011/0077900 A1 * | 3/2011 | Corghi | G01B 11/2755 702/150 |
| 2011/0170118 A1 * | 7/2011 | Mika | G05D 1/0234 324/207.13 |
| 2012/0287280 A1 * | 11/2012 | Essati | G01C 21/005 382/104 |
| 2013/0325252 A1 * | 12/2013 | Schommer | G01S 7/4972 701/33.1 |
| 2014/0195112 A1 * | 7/2014 | Lu | B60G 17/016 703/2 |
| 2014/0253909 A1 | 9/2014 | McClenahan et al. | |
| 2014/0265170 A1 * | 9/2014 | Giovanardi | F15B 13/0444 280/5.5 |
| 2015/0042716 A1 | 2/2015 | Beier et al. | |
| 2015/0224845 A1 * | 8/2015 | Anderson | B60G 17/052 701/37 |
| 2016/0333690 A1 | 11/2016 | Puura et al. | |
| 2017/0106738 A1 * | 4/2017 | Gillett | B62K 25/02 |
| 2017/0136891 A1 * | 5/2017 | Ricci | B60L 5/18 |
| 2017/0136892 A1 * | 5/2017 | Ricci | B60L 53/66 |
| 2017/0136893 A1 * | 5/2017 | Ricci | B60L 53/126 |
| 2018/0022208 A1 * | 1/2018 | Calleija | B60K 7/0007 180/2.2 |
| 2019/0266418 A1 * | 8/2019 | Xu | G06V 10/457 |
| 2019/0322368 A1 * | 10/2019 | Melcher | B64G 1/002 |
| 2021/0146543 A1 * | 5/2021 | Cristache | B25J 9/162 |
| 2021/0190922 A1 * | 6/2021 | Yu | G01S 15/931 |

FOREIGN PATENT DOCUMENTS

| | | | | |
|---|---|---|---|---|
| CN | 104203584 A | | 12/2014 | |
| CN | 106696747 A | | 5/2017 | |
| CN | 112540671 A | * | 3/2021 | ............ B25J 13/08 |
| CN | 113269299 A | * | 8/2021 | ............ B25J 9/161 |
| DE | 102020124285 A1 | * | 3/2021 | ............ B25J 13/08 |
| EP | 2216144 A1 | | 8/2010 | |
| WO | WO-2015197206 A1 | * | 12/2015 | ............ B61K 9/08 |
| WO | WO-2015197207 A1 | * | 12/2015 | ............ B61K 9/08 |
| WO | WO-2020125839 A1 | * | 6/2020 | ............ G09F 27/00 |

OTHER PUBLICATIONS

International Search Report and Written Opinion for International Application No. PCT/EP2017/081238, dated Jun. 6, 2018, 11 pages.

* cited by examiner

METHOD FOR MAINTENANCE OF A VEHICLE

This application is a 35 USC 371 national phase filing of International Application No. PCT/EP2017/081238, filed Dec. 1, 2017, the disclosure of which is incorporated herein by reference in its entirety.

TECHNICAL FIELD

The invention relates to a method for maintenance of a vehicle.

The invention can be applied in heavy-duty vehicles, such as trucks and buses. Although the invention will be described with respect to trucks, the invention is not restricted to heavy-duty vehicles, but may also be used in other types of vehicles such as cars.

BACKGROUND

It is desired to increase the efficiency of vehicle service, repair and maintenance procedures.

US2014253909 discloses a vehicle wheel service system including sensors in a proximity to a vehicle, to measure angles associated with axles of the vehicle, without repositioning the mounting of the sensors after initiating a measurement procedure. Additional sensors, associated with a vehicle reference, such as the vehicle frame axis, are disposed to provide vehicle reference measurement data. While such a system may provide wheel and axle measurements, there is however a desire to improve the efficiency of other service and maintenance measures.

SUMMARY

An object of the invention is to increase the efficiency of vehicle service, repair and/or maintenance procedures.

The object is reached by a method according to claim 1. Thus, the invention provides a method for maintenance of a vehicle, comprising determining the position, in a fixed coordinate system, of at least one first part of a vehicle, characterized by determining the identity of the vehicle, retrieving, by means of the vehicle identity, spatial data indicating how a second part of the vehicle is spatially related to the first part, and determining the position, in the fixed coordinate system, of the second part based at least partly on the first part position and the spatial data.

The fixed coordinate system may refer the vehicle to one or more surrounding devices. The spatial data may give the spatial relationship between two parts of the vehicle. Such information may be provided by use of a local coordinate system, linked to the vehicle. The determining of the position, in the fixed coordinate system, of the second part based partly on the first part position may require information about the orientation of the local coordinate system in relation to the fixed coordinate system. This may require the information about the orientation of the vehicle, in relation to the fixed coordinate system. For this, respective positions of a plurality of, e.g. four, first parts, may be determined, e.g. as exemplified below. Thus, the position, in the fixed coordinate system, of at least one of the at least one first part, and the orientation of the vehicle, makes it possible to establish the position of the second part, by means of the spatial data.

The spatial data may give information about the spatial relationship between two parts of a sprung sub-assembly of a vehicle. Additionally, or alternatively, the spatial data may give information about the spatial relationship between a part of an un-sprung sub-assembly of a vehicle, and a part of a sprung sub-assembly of the vehicle, as exemplified below.

The position of the second part, in the fixed coordinate system, allows for guiding a robot to the second part, as exemplified below. Thus, the method may comprise guiding a robot to the second part by means of the determined position of the second part. The robot could be guided to the second part for a service, repair, or maintenance measure. Thereby, the efficiency of vehicle service, repair, and/or maintenance procedures may be increased.

Preferably, the spatial data is at least partly based on design information for the vehicle. Preferably, the spatial data is at least partly based on information from a manufacturing process of the vehicle. As exemplified below, this may be done based on the identity of the vehicle. The latter may be provided, e.g. in the form of a vehicle identification number (VIN). Thereby, during the maintenance process, advantageous use is made of the manufacturing process. In the manufacturing process, data may have been recorded, which data provides spatial relationships between parts of the vehicle. Such manufacturing process data may complement design data since individual vehicles may differ, although designed according to the same design data.

Preferably, the at least one first part is at least one portion of a vehicle structure, or at least one element fixed to the vehicle structure. The vehicle structure may be a chassis of the vehicle. The portion of the structure may be a characteristic feature such as a bolt head. The at least one element may be at least one marker fixed to the vehicle structure. A vehicle structure may provide a solid foundation, on which the determination of the second part position may be made. One or more elements fixed to the structure may be used where the structure is, for some reason, obscured, e.g. by a spoiler. The element(s) may thereby reach from the structure to an unobscured position. With known dimensions and mounting geometries of the elements, the position of the vehicle structure may be readily determined based on the determined element positions.

Preferably, determining the respective position of the at least one first part comprises determining a distance from a distance measuring device to the respective first part. The distance may be substantially horizontal. In some embodiments, the distance is substantially vertical. Thereby, the position and orientation of the vehicle may be determined by measuring the distance, from a known respective position of the measuring device, to a respective position of each of a plurality of first parts.

In some embodiments, the first part position determination comprises determining a respective position, in the fixed coordinate system, of at least one component of the vehicle, and retrieving, by means of the vehicle identity, further spatial data indicating how the at least one first part is spatially related to the vehicle component.

Thereby, the first part position determination may further comprise providing a respective indication of the position of the at least one first part, based at least partly on the further spatial data, and determining the position of the at least one first part, based on the respective position indication.

The position of the component may be established by a measure that is known per se, and exemplified below. For, example, the component position(s) may be determined by laser measurement technology and/or camera image analysis. Similarly to what was mentioned above, the further spatial data may be at least partly based on information from a manufacturing process of the vehicle, and/or at least partly based on design information for the vehicle. Providing a respective indication of the position of the at least one first part may involve providing a preliminary position of the at least one first part. The indication gives an advantageous guidance to a system performing the method, on where to search for the first part. The indication may give a guidance to the system, on where to direct measuring device(s) to find the first part. Without such an indication, the system may have to search freely in the space of the maintenance facility, in order to find the first part, and this might be very difficult or impossible. Embodiments of the invention solve the problem of knowing the exact position of the vehicle in a maintenance facility, to enable robots to interact with the vehicle.

The method may comprise registering a load and/or a height of the vehicle, wherein the respective indication of the position of the at least one first part, is provided at least partly based on the registered load and/or height. The at least one vehicle component may be included in an un-sprung sub-assembly of the vehicle, and the first part may be included in a sprung sub-assembly of the vehicle. Also, the second part may be included in the sprung sub-assembly of the vehicle. Thereby, the positions of the component and the first part, in relation to each other, may depend on the vehicle load, since a vehicle suspension might be affected by the load. The height of the vehicle may vary, e.g. depending on the vehicle load. Thus, where the component is included in the un-sprung sub-assembly of the vehicle, and the first part is included in the sprung sub-assembly, their relative locations may vary depending on the height. Therefore, the vehicle load and/or height may be used to improve the indication of where to search for the first part.

The height of the vehicle may be determined by one or more sensors in an air suspension system of the vehicle. Once the first part position is determined, the height of the vehicle may be determined based thereon, and the air suspension sensors may be calibrated.

In some embodiments, the at least one vehicle component is a respective center of at least one wheel of the vehicle. Advantageously, a wheel alignment system is used for the determination of the respective position of the respective wheel center. Thereby, a known device may be used for embodiments of the inventive method. The same wheel alignment system may used for the determination of the respective position of the at least one first part. Thereby, equipment that is readily available in vehicle maintenance facilities may be used for embodiments of the inventive method.

Preferably, determining the first part position is done by means of a sensor mounted to the vehicle. In preferred embodiments, the sensor is mounted to the sprung sub-assembly of the vehicle. The sensor may be of any suitable type, e.g., a radar sensor, or a camera. Determining the first part position preferably comprises determining the position of a front part of the vehicle. In some embodiments, the vehicle mounted sensor is used to detect the distance to an object, e.g. a wall or some other object, movable or fixed, in a known position, in front of the vehicle. Based on said distance, the longitudinal position of the sensor can be determined. Hence, based on said distance, the longitudinal position of the vehicle can be determined. The longitudinal position of the vehicle mounted sensor and/or the vehicle, may be used to provide an indication of the position of the first part(s), in the fixed coordinate system. For such an indication, spatial data may give, in a local coordinate system linked to the vehicle, the position of the first part(s) in relation to the position of the vehicle mounted sensor.

Preferably, the first and second parts are included in a sprung sub-assembly of the vehicle. Thereby, the spatial data may give an accurate indication of the position of the second part, in a local coordinate system linked to the vehicle. As also suggested above, by determining the orientation of the vehicle, or at least the sprung sub-assembly of the vehicle, the position of the second part, in the local coordinate system, can be expressed as a position of the second part in the fixed coordinate system.

Preferably, the first part position determination comprises
  determining positions, in the fixed coordinate system, of respective centers of a plurality of wheels of the vehicle, and
  retrieving further spatial data indicating how a plurality of first parts are spatially related to the wheel centers.

Thereby, the first part position determination may further comprise
  providing indications of the positions of the first parts, based at least partly on the further spatial data, and
  determining the positions, in the fixed coordinate system, of the first parts, based on the position indications.

By determining the respective centers of a plurality of, e.g. four, wheels of the vehicle, the orientation of an un-sprung sub-assembly of the vehicle may be determined. This orientation may assist, together with the spatial data, in providing indications of the positions of the first parts.

In advantageous embodiments, the method comprises determining, based at least partly on the position of the at least one first part, the position of a center line of the vehicle. This may be done e.g. by establishing the position of four first parts, and determining the orientation of a vehicle sprung sub-assembly based on the first part positions. The determination of the position of the second part may be based at least partly on the spatial data and the center line position. As suggested, the second part position may be used to guide a robot in the maintenance procedure. The position of the center line may have other advantageous uses. For example, a sensor of the vehicle, for automatic driving or driving assistance, may be calibrated based at least partly on the center line position. As a further example, a light of the vehicle may be calibrated based at least partly on the center line position. In addition, wheel axle orientations in relation to the center line may be determined. For this, said wheel center positions may be used as wheel hub positions.

In some embodiments, determining the position of the second part comprises providing a respective indication of the position of the second part, based at least partly on the spatial data, wherein the position of the second part is determined based on the respective position indication. This could be useful where the first part is included in an un-sprung sub-assembly of the vehicle, and the second part is included in a sprung sub-assembly of the vehicle. In some embodiments, each of the at least one first part is a respective center of at least one wheel of the vehicle.

Similarly to what has been suggested above, the position of the first part may be established by a measure that is known per se, e.g. by a wheel alignment system. Similarly to what was mentioned above, the spatial data may be at least partly based on information from a manufacturing process of the vehicle, and/or at least partly based on design information for the vehicle. Providing an indication of the position of the second part may involve providing a preliminary position of the second part. The indication of the position of the second part may be provided at least partly based on a registered load and/or height of the vehicle.

In some embodiments, determining the second part position may be done by means of a sensor mounted to the vehicle. Similarly to what has been suggested above, such a sensor may be used to determine a longitudinal position of the vehicle in the maintenance facility. Distance measuring devices in the maintenance facility may be used to determine the lateral position of the vehicle. Provided enough such distance data is available, the orientation of the vehicle may also be determined.

It is understood that a step of entering the vehicle into a vehicle maintenance facility may be carried out, before performing any of the steps of an embodiment of the inventive method. Thereby, all the steps of the method embodiment may be performed in the maintenance facility.

The object is also reached with a computer program, a computer readable medium, or a control unit.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
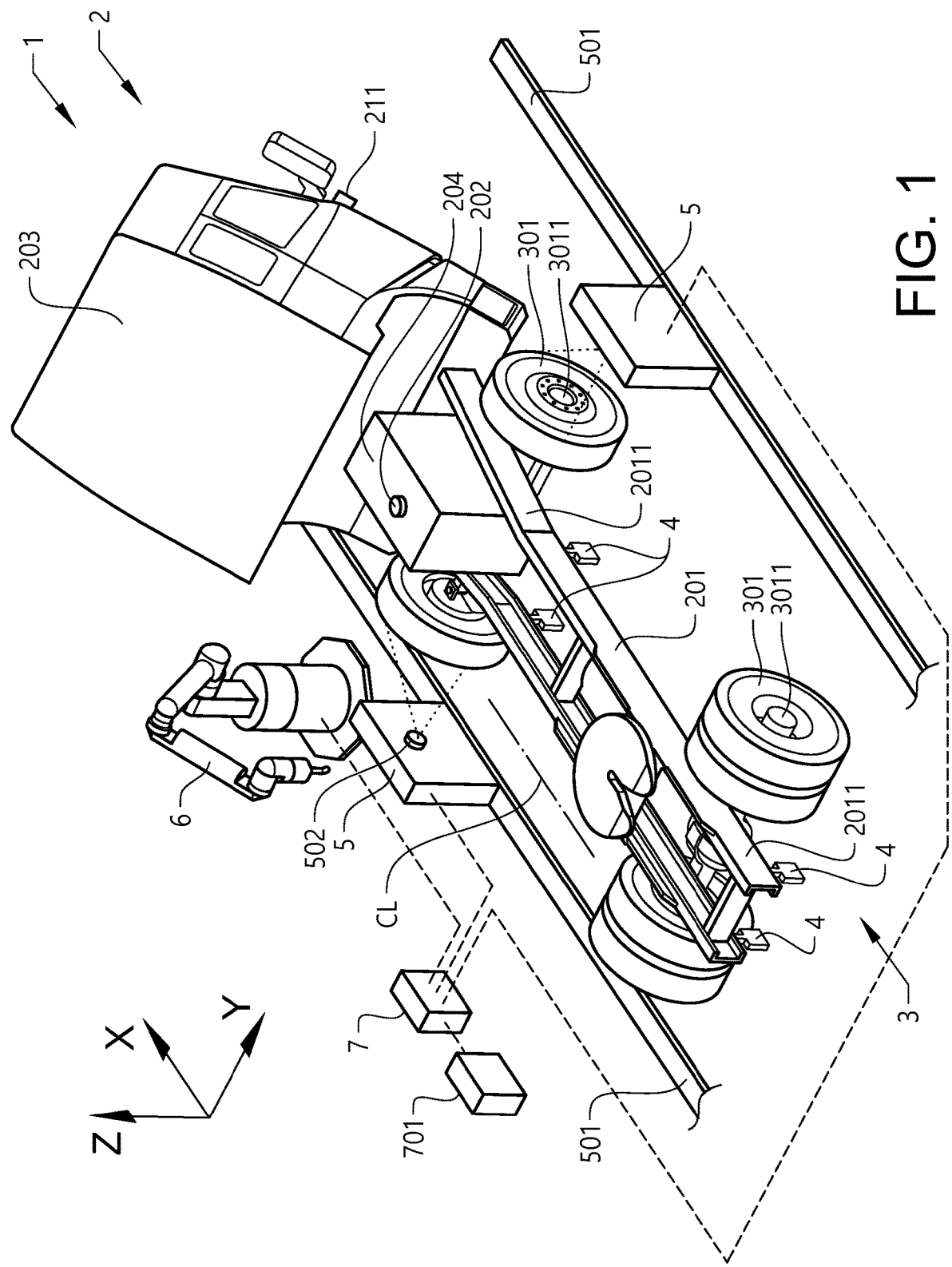
FIG. 1 shows a perspective view of a vehicle in a vehicle maintenance facility.

FIG. 1 shows a vehicle 1 in the form of a truck. The vehicle has been entered into a vehicle maintenance facility. The vehicle comprises an un-sprung sub-assembly 3 with a plurality of wheels 301, in this example four wheels. The vehicle further comprises a sprung sub-assembly 2, with a vehicle structure in the form of a chassis 201. The chassis 201 includes a frame with two beams 2011. The beams 2011 extend in parallel along a longitudinal direction of the vehicle. A driver's cab 203 is tilted forward so as to allow access, for maintenance purposes, to an internal combustion engine 204 of the vehicle.

The vehicle comprises a sensor for automatic driving or driving assistance, in the form of a radar emitter and detector 211, herein also referred to as a radar sensor 211. In addition, or alternatively, the vehicle could comprise a camera for automatic driving or driving assistance. Such a camera could be mounted inside a wind screen of the vehicle.

The maintenance facility comprises a robot 6. The robot 6 is arranged to be controlled by a control unit 7. The control unit can be provided in any suitable form, e.g. in the form of a computer, arranged to run a computer program comprising program code means. The control unit 7 is arranged to access and retrieve data from a data storage device 701. The data storage device may be located in the maintenance facility, or remotely.

The maintenance facility further comprises a wheel alignment system. The wheel alignment system could be of any suitable type, e.g. a system marketed under the name of Corghi. The wheel alignment system comprises two wheel measuring devices 5. Each wheel measuring device 5 is arranged to move along a rail 501. The rails 501 are parallel. The vehicle 1 is parked between the rails 501, so that the wheel measuring devices 5 can move along respective sides of the vehicle. It should be noted that the wheel alignment system may comprise any suitable number of wheel measuring devices 5, such as two, three, or more.

For this presentation, a fixed coordinate system is determined. The fixed coordinate system is, in this example, fixed with the manufacturing facility. As indicated in FIG. 1, an x-axis is defined as parallel with the rails 501, which are parallel with the longitudinal direction of a vehicle parked straight between the rails. A y-axis is horizontal and transverse two the x-axis, and a z-axis is vertical. Each wheel measuring device 5 is arranged to measure, and to thereby register positions of objects along the x-axis, the y-axis, and the z-axis.

Each wheel measuring device 5 comprises a measuring element 502 which is arranged move in relation to the remainder of the measuring device 5, along the y-axis, and along the z-axis. Thus, since each wheel measuring device 5 is arranged to move along the x-axis, each measuring element 502 may move in three dimensions. The measuring element 502 is arranged to measure a distance to an object.

The control unit 7 is arranged to receive signals from the wheel measuring devices 5, representing results of measurements made by the wheel measuring devices 5. The control unit is further arranged to control the location of the wheel measuring devices 5 along the rails 501.

Figure 2:
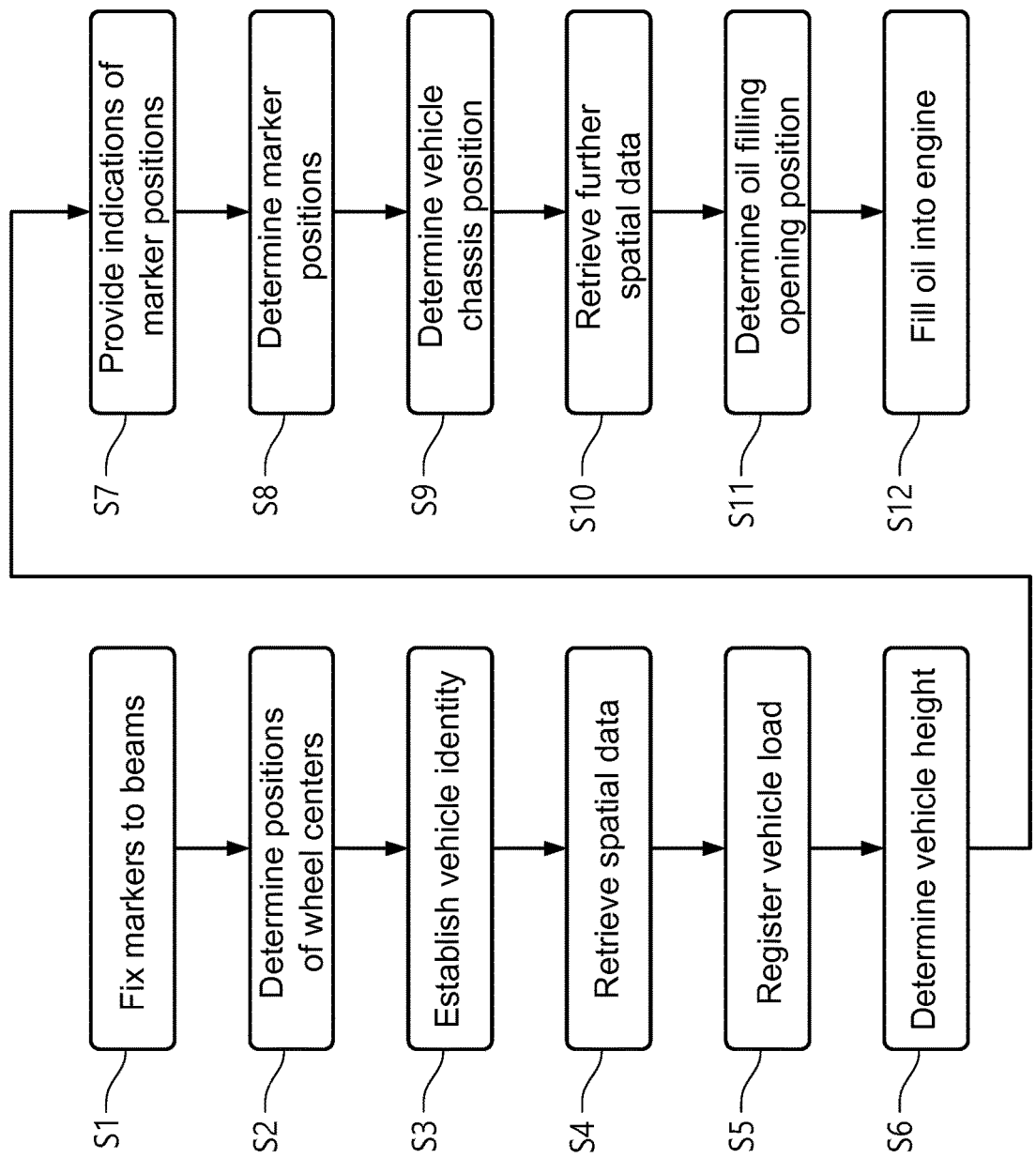
FIG. 2 is a block diagram depicting steps in a method for maintenance of the vehicle in FIG. 1.

Reference is made also to FIG. 2. In a method for maintenance of the vehicle, steps are taken for the robot 6 to automatically fill liquid in the form of oil into the engine 204. The oil filling is to take place through a second part, in the form of an oil filling opening 202, presented by the engine. The oil filling procedure is an example only. The invention is applicable to a variety of automatic maintenance procedures, such as filling other fluids into the engine, e.g. a transmission oil, a rear axle oil, a cooling liquid, etc.

It should be noted that the robot 6 may be arranged to access a vehicle part from any suitable direction. For example, the robot may be arranged to access the second part from above, from below, and/or horizontally. The oil filling opening 202 may be located on top of the engine. The oil filling opening 202 may be accessed from above. In some embodiments, the second part may be an oil drain plug. Such a plug may be located in the bottom of the engine. Such a plug may be accessed from below.

The method includes fixing 51 a plurality of, in this example four, elements in the form of markers 4, to the beams 2011. The markers 4 are herein also referred to as first parts.

The markers 4 are fixed to the beams 2011 so that they have spatial relationships to the beams, which are known or accessible to the control unit 7. This could be accomplished, for example, by fastening devices for the markers 4 on the beams 2011, whereby the locations of the fastening devices, and certain geometrical features of the markers, are known or accessible to the control unit 7. The markers could be fixed by any suitable fastening means, e.g. by bayonet fasteners.

It should be noted that in some embodiments, the markers 4 are fixed to the vehicle structure 201 in the maintenance facility. Thereby, the markers may remain on the vehicle structure 201 after completion of the maintenance procedure. Thereby, the markers may be used at a subsequent maintenance procedure. In other embodiments, the markers 4 may be removed before the vehicle is removed from the maintenance facility. In some embodiments, the markers 4 could be fixed to the vehicle structure 201 in a factory manufacturing the vehicle.

The markers 4 are arranged so that they are easily detectable by sensors of the wheel measuring devices 5. For this, the markers 4 may include reflectors, detectable by a laser positioning system of the wheel measuring devices 5. In this example, the reflectors are mounted on connecting devices, which in turn are mounted to the beams 2011. In alternative embodiments, the reflectors could be mounted directly to the beams 2011. In yet further embodiments, the markers 4 could be provided by applying a coating, e.g. of reflective paint, to the beams.

The method further comprises determining S2, by means of the wheel measuring devices 5, positions of vehicle components in the form of the centers 3011 of the wheels 301 of the vehicle. Said wheel center positions are determined, in the fixed coordinate system, with values in all three dimensions. The center of a wheel may be formed by a point on the rotational axis of the wheel, which point is on an outer surface of the wheel hub. The position of this point may be the position of the wheel center 3011.

The method also comprises establishing S3 the identity of the vehicle. This may be done by manually entering a unique vehicle identification code, e.g. a vehicle identification number (VIN), into the control unit 7. Alternatively, such a code may be extracted automatically, e.g. by using a radio frequency identification (RFID) tag, or by registering a sign on the vehicle, e.g. with a chassis number, by means of an imaging device, such as a camera, and extracting the sign information by an image treatment software.

The vehicle identity is provided to the control unit 7. By means of the vehicle identity, the control unit retrieves S4 spatial data. The spatial data may be stored in the data storage device 701. The spatial data indicates how the markers 4 are spatially related to the wheel centers 3011. More specifically, the spatial data includes information on how the markers 4 are spatially related to the wheel centers 3011. However, since the markers and wheel centers are fixed to the vehicle sprung sub-assembly 2, and the vehicle un-sprung sub-assembly 3, respectively, said information in the spatial data may not be exactly accurate.

The spatial data is partly based on design information for the vehicle, and partly based on information from a manufacturing process of the vehicle. More specifically, during the manufacturing process, data is recorded, which data may provide spatial relationships between parts of the vehicle. Such manufacturing process data may complement design data since individual vehicles may differ, although designed according to the same design data.

The method also comprises registering S5 a load of the vehicle. The load is measured e.g. by means of load sensing means in a support structure for the vehicle. Since the load may affect the vehicle suspension, the load may assist in establishing how the markers 4 are spatially related to the wheel centers 3011. The height of the vehicle is also determined S6, e.g. by one or more sensors in an air suspension system of the vehicle. The vehicle height may further assist in establishing how the markers 4 are spatially related to the wheel centers.

Based on the positions of the wheel centers 3011, the spatial data, the vehicle load, and the vehicle height, indications of the positions of the markers 4 are provided S7 in the fixed coordinate system. The marker position indications are provided as preliminary positions. Thereupon, the wheel measuring devices 5 are controlled so as to find the position of the markers 4, using the preliminary positions. Thereby, the positions of the markers 4 are determined S8 based on the position indications.

Thus, the wheel alignment system 5 is used in the process of guiding the robot 6 to the second part, in this example the oil filling opening 202.

In alternative embodiments, instead of markers 4, positions of a plurality of portions of the vehicle chassis 201 may be determined based on position indications provided as described above. For such embodiments, such portions of the vehicle chassis 201 are herein referred to as first parts. For example, the first parts may be bolt heads, or similar formations, e.g. on the beams 2011. Thus, the positions of the bolt heads may be determined based on position indications.

Based on the marker positions, the position, including the orientation, of the vehicle chassis 201 is determined S9. Thereby, a local coordinate system of the vehicle may be mapped to the fixed coordinate system.

The method also comprises retrieving S10, by means of the vehicle identity, further spatial data indicating how the oil filling opening 202 is spatially related to the chassis 201. This indication may be made in the local coordinate system. Similarly to the spatial data described above, the further spatial data is partly based on design information for the vehicle, and partly based on information from a manufacturing process of the vehicle.

In addition, or alternatively, the further spatial data may indicate how the oil filling opening 202 is spatially related to the markers 4. The positions of the markers, in this example four of them, allows for the orientation of the vehicle in the fixed coordinate system to be determined. Thereby, the local coordinate system of the vehicle may be mapped to the fixed coordinate system. Thereby, the position of the oil filling opening 202 may be determined directly based on the determined marker positions.

Based on the further spatial data and the chassis position, the position of the oil filling opening 202 is determined S11. Thereupon, the control unit 7 sends signals to the robot 6, based on which the robot can find the oil filling opening 202, and fill S11 oil into the engine 204. Thereby, the robot 6 is guided to the oil filling opening 202 by means of the determined position of the oil filling opening 202.

In some embodiments, based on the marker positions, the position, including the orientation, of a center line CL (FIG. 1) of the vehicle may be determined. Thereby, the method may comprise retrieving, by means of the vehicle identity, spatial data indicating how the oil filling opening 202 is spatially related to the center line CL.

Further, the center line position may be used to calibrate the radar emitter and detector 211. In addition, the center line position may be used to calibrate one or more lights of the vehicle, such as head lights, (not shown). Further, the center line may be used to check whether rotational axes of wheels of the vehicle are perpendicular to the longitudinal direction of the vehicle. Such a wheel alignment allows a reduction of tire wear and fuel consumption, and an improved vehicle road handling.

Figure 3:
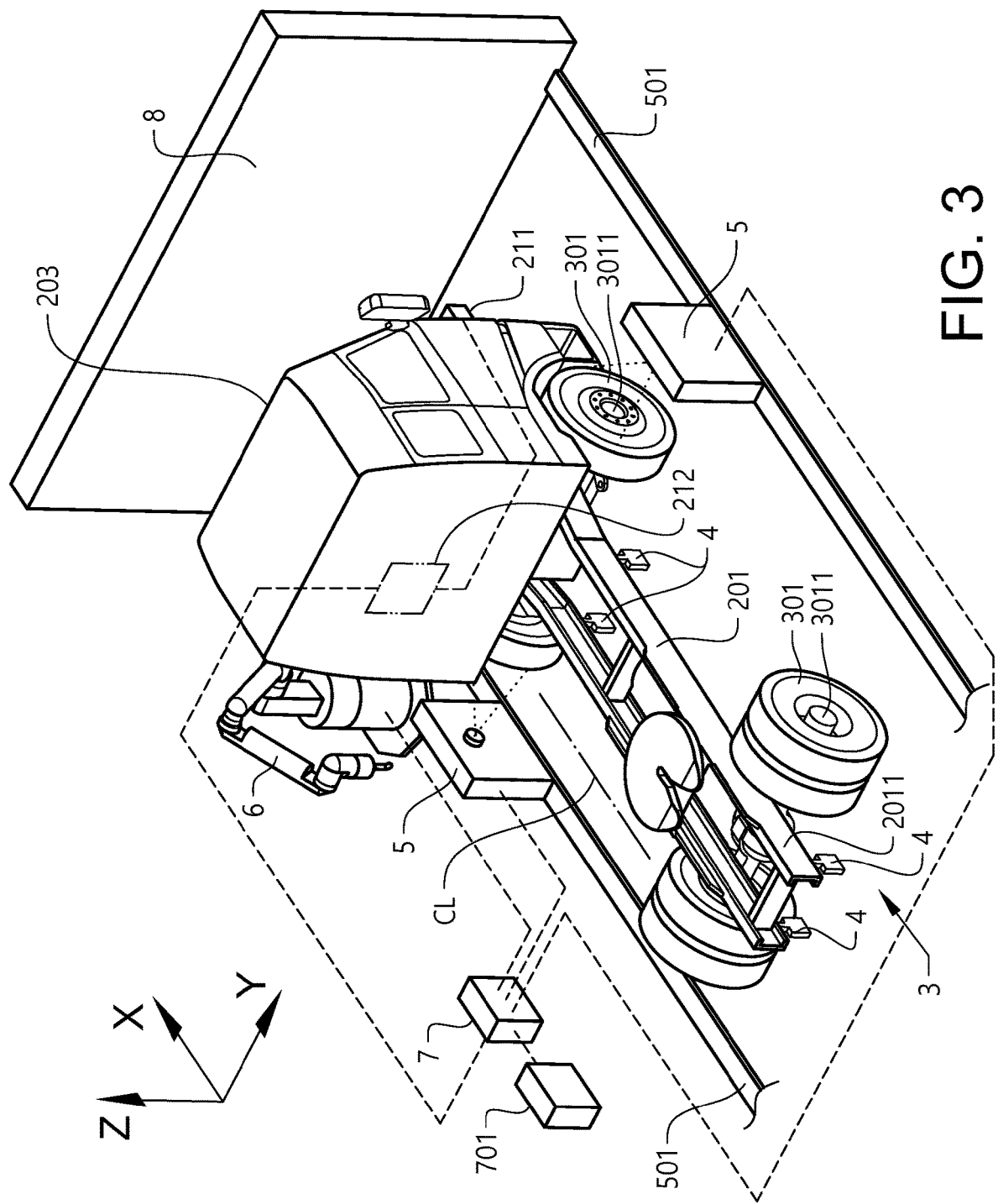
FIG. 3 shows a perspective view of a vehicle in a vehicle maintenance facility, arranged for a method according to an alternative embodiment of the invention.
Figure 4:
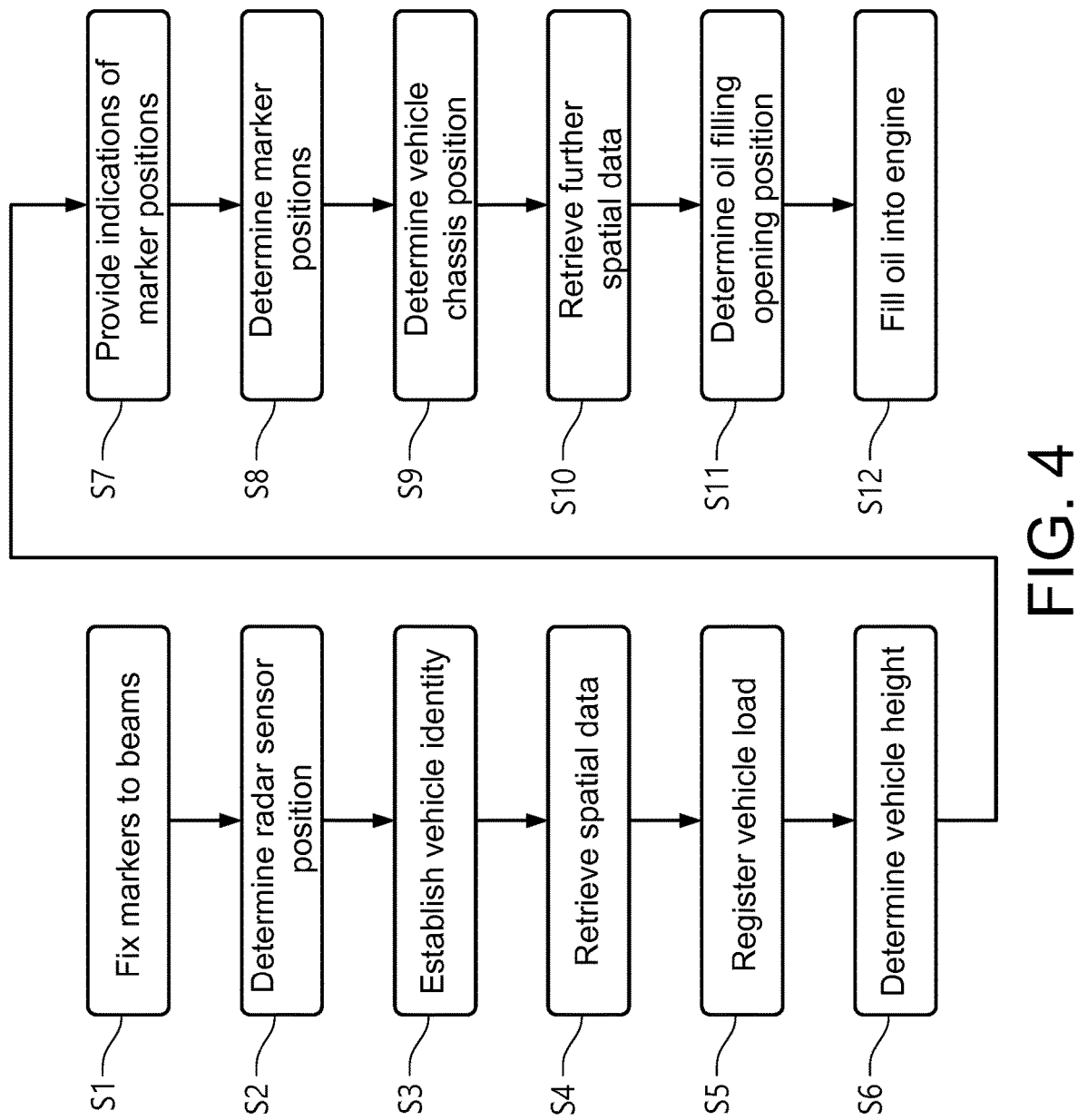
FIG. 4 is a block diagram depicting steps in the method carried out for the vehicle in FIG. 3.

Reference is made to FIG. 3 and FIG. 4. FIG. 4 depicts steps in a method according to an alternative embodiment of the invention. The method includes the same steps as the one described with reference to FIG. 2, except for the following:

Before the driver's cab 203 is tilted forward, the radar sensor 211 is used to determine the position of a front part of the vehicle, in this example the driver's cab 203. More specifically, the radar sensor 211 is used to detect the distance to a wall 8 in front of the vehicle. The results are provided to the control unit via a vehicle controller 212. Based on the measurement by the radar sensor 211, the control unit 7 can determine S21 the longitudinal position of the radar sensor 211.

Similarly to the method described with reference to FIG. 2, the identity of the vehicle is determined S3, and the control unit retrieves S4 spatial data. The spatial data indicates how the markers 4 are spatially related to the radar sensor. Based on the position of the radar sensor 211, the spatial data, and optionally the vehicle load and height, retrieved S5, S6 as described above, preliminary positions of the markers 4 are provided S7, in the fixed coordinate system. Thereupon, the wheel measuring devices 5 are controlled so as to find the position of the markers 4, using the preliminary positions. Thereby, the positions of the markers 4 are determined S8 based on the position indications.

In the embodiments described above, the positions of the markers, or portions of the vehicle chassis, have been determined by horizontal measurements by means of the wheel measuring devices 5. In some embodiments, measurements to determine positions of e.g. portions of the vehicle chassis, or markers fixed thereto, are done vertically.

Figure 5:
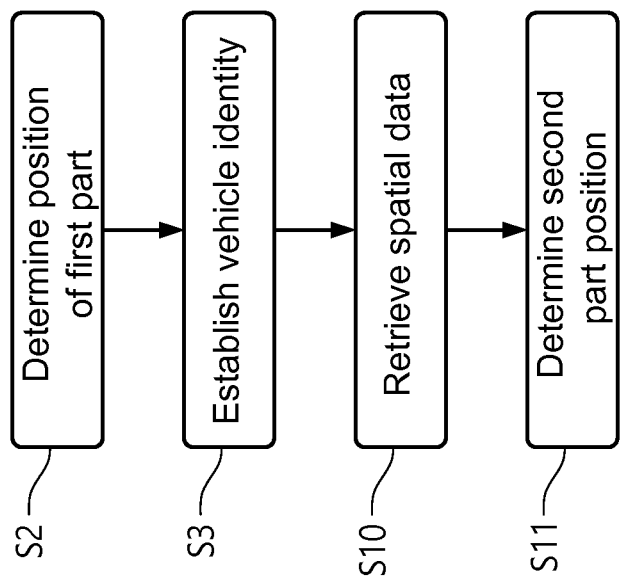
FIG. 5 is a block diagram depicting steps in a method according to a further embodiment of the invention.

FIG. 5 depicts steps in a method, according to a further embodiment of the invention, for maintenance of a vehicle. The method comprises determining S2 the position, in a fixed coordinate system, of at least one first part of the vehicle. The method further comprises determining S3 the identity of the vehicle. By means of the vehicle identity, spatial data indicating how a second part of the vehicle is spatially related to the first part, is retrieved S10. Based at least partly on the first part position and the spatial data, the position, in the fixed coordinate system, of the second part is determined S11.

It is to be understood that the present invention is not limited to the embodiments described above and illustrated in the drawings; rather, the skilled person will recognize that many changes and modifications may be made within the scope of the appended claims.

The invention claimed is:

1. A method for maintenance of a vehicle, comprising:
determining an identity of a vehicle,
determining a position, in a fixed coordinate system, of at least one first part of the vehicle,
retrieving, by means of the identity, spatial data indicating how a second part of the vehicle is spatially related to the at least one first part, and
determining a position, in the fixed coordinate system, of the second part, based at least partly on the position of the at least one first part and the spatial data; and
further comprising one of:
wherein determining the position of the at least one first part comprises determining a respective position, in the fixed coordinate system, of at least one component of the vehicle, and retrieving, by means of the vehicle identity, further spatial data indicating how the at least one first part is spatially related to the vehicle component, wherein the at least one vehicle component is included in an un-sprung sub-assembly of the vehicle, and the first part is included in a sprung sub-assembly of the vehicle; or
wherein determining the position of the second part comprises providing a respective indication of the position of the second part, based at least partly on the spatial data, wherein the position of the second part is determined based on the respective position indication, wherein the first part is included in an un-sprung sub-assembly of the vehicle, and the second part is included in a sprung sub-assembly of the vehicle.

2. The method of claim 1, further comprising guiding a robot to the second part based on the determined position of the second part.

3. The method of claim 1, wherein the spatial data is at least partly based on information from a manufacturing process of the vehicle.

4. The method of claim 1, wherein the spatial data is at least partly based on design information for the vehicle.

5. The method of claim 1, wherein the at least one first part is at least one portion of a vehicle structure, or at least one element fixed to the vehicle structure.

6. The method of claim 5, wherein the vehicle structure is a chassis of the vehicle.

7. The method of claim 5, wherein the at least one element is at least one marker fixed to the vehicle structure.

8. The method of claim 1, wherein determining the position of the at least one first part comprises determining a distance from a distance measuring device to the respective first part.

9. The method of claim 8, wherein the distance is substantially horizontal.

10. The method of claim 8, wherein the distance is substantially vertical.

11. The method of claim 1, wherein determining the position of the at least one first part further comprises:
providing a respective indication of the position of the at least one first part, based at least partly on the further spatial data, and
determining the position of the at least one first part, based on the respective position indication.

12. The method of claim 11, further comprising registering at least one of a load or a height of the vehicle, wherein the respective indication of the position of the at least one first part is provided at least partly based on at least one of the registered load or height.

13. The method of claim 1, wherein the second part is included in the sprung sub-assembly of the vehicle.

14. The method of claim 1, wherein the at least one vehicle component is a respective center of at least one wheel of the vehicle.

15. The method of claim 14, wherein a wheel alignment system is used for the determination of a respective position of the respective wheel center, and the same wheel alignment system is used for the determination of the respective position of the at least one first part.

16. The method of claim 1, wherein determining the position of the at least one first part is based on a sensor mounted to the vehicle.

17. The method of claim 16, wherein the sensor is a radar sensor.

18. The method of claim 16, wherein determining the position of the at least one first part comprises determining a position of a front part of the vehicle.

19. The method of claim 1, wherein the at least one first and second parts are included in a sprung sub-assembly of the vehicle.

20. The method of claim 1, wherein determining the position of the at least one first part comprises:
  determining positions, in the fixed coordinate system, of respective centers of a plurality of wheels of the vehicle, and
  retrieving further spatial data indicating how a plurality of first parts are spatially related to the wheel centers.

21. The method of claim 20, wherein determining the position of the at least one first part further comprises:
  providing indications of the positions of the first parts, based at least partly on the further spatial data, and
  determining the positions, in the fixed coordinate system, of the first parts, based on the position indications.

22. The method of claim 1, further comprising determining, based at least partly on the position of the at least one first part, a position of a center line of the vehicle.

23. The method of claim 22, wherein determining the position of the second part is based at least partly on the center line position.

24. The method of claim 22, further comprising calibrating a sensor of the vehicle, for automatic driving or driving assistance, based at least partly on the center line position.

25. The method of claim 22, further comprising calibrating a light of the vehicle, based at least partly on the center line position.

26. The method of claim 1, wherein each of the at least one first part is a respective center of at least one wheel of the vehicle.

27. The method of claim 1, wherein determining the position of the at least one first part is based on a sensor mounted to the vehicle.

* * * * *